Patented May 11, 1948

2,441,214

UNITED STATES PATENT OFFICE 2,441,214

HYDROCARBON CONVERSION CATALYST

Charles L. Thomas, Winnetka, and Curtis F. Gerald, Riverside, Ill., assignors to Universal Oil Products Company, Chicago, Ill., a corporation of Delaware No Drawing. Application February 15, 1946, Serial No. 648,022

13 Claims. (Cl. 252—254)

This invention relates to a process for producing a catalyst useful in hydrocarbon conversion reactions and particularly in processes for producing hydrocarbons of branched carbon structures.

An object of this invention is to produce a silicon-containing hydrocarbon conversion catalyst in which said silicon is derived from an organic silicon compound selected from the group consisting of a silanol and a silicone.

Another object of this invention is to produce a hydrocarbon conversion catalyst by reacting a silicone or siloxane with anhydrous aluminum chloride and treating the resultant product with an aqueous solution of a base to form a precipitate, drying and calcining said precipitate to form a silica-alumina composite.

One specific embodiment of the present invention relates to a process for preparing a hydrocarbon conversion catalyst which comprises treating an aqueous solution of a salt of a metal selected from the group consisting of aluminum, magnesium and zirconium; an organic silicon compound comprising carbon, hydrogen, oxygen and silicon in which said oxygen is combined with said silicon; and an aqueous solution of a base to form a precipitate, washing said precipitate and drying the washed material.

Another embodiment of this invention relates to a process for preparing a hydrocarbon conversion catalyst which comprises treating an aqueous solution of a salt of a metal selected from the group consisting of aluminum, magnesium and zirconium; a siloxane; and an aqueous solution of a volatile base to form a precipitate, washing said precipitate and drying the washed material.

A further embodiment of this invention relates to a process for preparing a hydrocarbon conversion catalyst which comprises treating an aqueous solution of a salt of a metal selected from the group consisting of aluminum, magnesium and zirconium; a polymeric di-alkyl siloxane; and an aqueous solution of a volatile base to form a precipitate; washing said precipitate and drying the washed material.

The organic silicon compounds which are utilizable as starting materials in our process for producing a hydrocarbon conversion catalyst contain chemically combined carbon, hydrogen, oxygen and silicon in which the oxygen atoms are combined with the silicon atoms. These organic silicon compounds include particularly the silanols and silicones or siloxanes. The organosilicon chlorides corresponding to the silanols in their arrangement of carbon and silicon atoms may also be used since in an aqueous medium these organo-silicon chlorides are hydrolyzed to the silanols. Certain ethers of silanols which hydrolyze to form silanols are also utilizable in our process.

By a silanol we mean a compound corresponding to one of the following three formulas:

$R_3SiOH \qquad R_2Si(OH)_2 \qquad RSi(OH)_3$ in which R represents an alkyl, aryl or aralkyl group. The silanols so employed may be pure compounds containing one or more of the same or different R groups, or mixtures of different silanols may be utilized in our process.

The silicon of our hydrocarbon conversion catalysts may also be derived from a silicone. The term "silicone" is a general term which is descriptive of organic silicon compounds containing carbon-silicon linkages and silicon-oxygen-silicon linkages. Silicones are of three types, namely (1) the dehydration product of a silanol of the formula $R_3SiOH$ which may be called a monosilanol; (2) the dehydration product of a silanediol of the formula $R_2Si(OH)_2$ and (3) the dehydration product of a silanetriol represented by the formula $RSi(OH)_3$. The formulas of these different silanols and of their corresponding dehydration products, which are known as silicones and also as siloxanes are listed below:

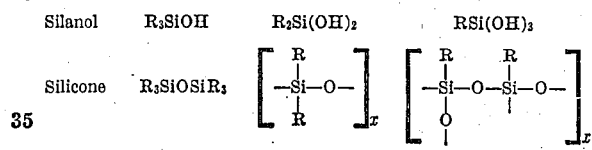

Silanol $\quad R_3SiOH \qquad R_2Si(OH)_2 \qquad RSi(OH)_3$

Silicone $\quad R_3SiOSiR_3 \qquad \left[\begin{array}{c} R \\ -Si-O- \\ R \end{array}\right]_x \qquad \left[\begin{array}{cc} R & R \\ | & | \\ -Si-O-Si-O- \\ | & | \\ O & \end{array}\right]_x$ According to our invention, hydrocarbon conversion catalysts are prepared by reacting a compound of a metal selected from the group consisting of aluminum, magnesium and zirconium, and particularly a compound of aluminum and a middle halogen, with an organic silicon compound comprising carbon, hydrogen, oxygen, and silicon in which said oxygen is combined with silicon to form a complex, treating said complex with water and a base, particularly a volatile base, to form a precipitate, washing said precipitate to remove water-soluble salts, and drying the washed material. Thus a catalyst may be prepared by dissolving or suspending a silanol in a solution of a salt of a metal selected from the group consisting of aluminum, magnesium and zirconium and adding an aqueous solution of an alkali metal hydroxide or a volatile basic precipitant such as ammonia or ammonium hydroxide. This precipitates hydrated alumina, zirconia or magnesia in or upon the silicon-containing material and the resultant material is then washed with water and dried. Alternatively, the hydrated alumina, hydrated zirconia or hydrated magnesia may be prepared separately and then mixed with the silanol in the wet state after which the resultant mixture is washed and dried. Also, organo-silicon chlorides corresponding in carbon and silicon structure to the silanols may be used since these organo-silicon chlorides will be hydrolyzed to silanols in an aqueous system. Thus the organo-silicon chlorides can be mixed directly with hydrated alumina, hydrated zirconia, or hydrated magnesia to form composites convertible into our hydrocarbon conversion catalysts.

According to our invention, silanols and silicones may also be reacted with anhydrous aluminum chloride or anhydrous aluminum bromide to form a complex which is then treated with water and preferably with an aqueous solution of a volatile base to form a composite which is washed with water to remove water-soluble salts and then dried to a solid suitable for use as a hydrocarbon conversion catalyst.

Our silicon-containing catalysts produced as herein set forth are utilizable in producing hydrocarbons of branched carbon structures and include the cracking of paraffinic, olefinic, naphthenic and aromatic hydrocarbons in the presence or absence of added hydrogen; the polymerization of olefinic hydrocarbons; the alkylation of isoparaffinic, naphthenic and aromatic hydrocarbons and other aromatic compounds with olefins; the isomerization of paraffins, olefins and naphthenes; hydrogen transfer to produce saturated hydrocarbons from olefins; the disproportionation of alkyl groups in alkylated aromatic hydrocarbons; catalytic hydrocracking in the presence of added hydrogen and a hydrogenation catalyst; the reforming of straight run gasoline or naphthas to improve their antiknock qualities; the reforming of thermally cracked or catalytically cracked gasolines and naphthas; the reforming of mixtures of straight run and cracked gasolines and naphthas, etc.

These different hydrocarbon conversion reactions may be carried out in either batch or continuous types of treatment. While the catalyst temperature employed is generally dependent upon the particular hydrocarbon conversion reaction, temperatures of from about 150° to about 450° C. include the temperatures at which these various hydrocarbon conversion reactions take place. Thus temperatures of from about 150° to about 300° C. are useful in effecting polymerization and isomerization reactions of olefinic hydrocarbons, alkylations of aromatics with olefins, etc. The higher temperatures of from about 300° to about 450° C. are generally preferred in carrying out cracking, hydrocracking and reforming treatments of hydrocarbons, and some disproportionation, isomerization and hydrogen transfer reactions.

The following example is given to illustrate our process for producing hydrocarbon conversion catalysts and the type of results obtained in their use, although the data presented are not introduced with the intention of restricting unduly the generally broad scope of the invention.

30 grams of anhydrous aluminum chloride was mixed with 60 grams of a liquid mixture of straight chain dimethyl silicone polymers with an average molecular weight of about 6000 and a viscosity of about 200 centistokes. The resultant mixture upon being warmed on a water bath for a period of about 1 hour formed a clear liquid of lower viscosity than that of the original silicone polymers and small amounts of hydrogen chloride were evolved. After the resultant clear liquid had cooled, a white crystalline solid separated therefrom. This mixture of liquid and crystalline material was then heated on an oil bath while the temperature was increased during a period of 1 hour to 200° C. During this time hydrogen chloride and a combustible vapor were given off, the total loss in weight being about 30 grams. When the reaction mixture was cooled, a grayish waxy solid was formed. To this solid, 50 ml. of ammonium hydroxide solution and 200 ml. of water were added after which the resultant mixture was heated to boiling and a mixture of solid and aqueous solution resulted. The resultant solid after drying and calcining at 500° C. for 3 hours weighed 23 grams and had an average bulk density of 0.373.

The calcined solid, in the form of particles which passed through a 40-mesh screen was then used as a filler in a stainless steel reactor maintained at 500° C., while a Mid-Continent gas oil was passed continuously therethrough at atmospheric pressure and at an hourly liquid space velocity of 4. In this run the weight percentage conversion of the gas oil was 21.1 and the products recovered represented 98.3% of the weight of the gas oil charged. The gasoline yield was 13.5% by weight and the gas yield was 7.2% by weight of the gas oil charged.

The novelty and utility of the process of this invention are evident from the specification and example, although neither section is intended to limit unduly its generally broad scope.

We claim as our invention:

1. A process for producing a hydrocarbon conversion catalyst which comprises reacting a polymeric di-alkyl siloxane, a compound of a metal selected from the group consisting of aluminum, magnesium and zirconium, and an aqueous solution of a base to form a precipitate, and drying said precipitate.

2. A process for producing a hydrocarbon conversion catalyst which comprises reacting a salt of a metal selected from the group consisting of aluminum, magnesium and zirconium with a polymeric di-alkyl siloxane to form a complex, treating said complex with an aqueous solution of a volatile base to form a precipitate, and drying said precipitate.

3. A process for producing a hydrocarbon conversion catalyst which comprises reacting a polymeric di-alkyl siloxane, a water-soluble salt of a metal selected from the group consisting of aluminum, magnesium and zirconium, water and a volatile base to form a precipitate, washing said precipitate and drying the washed material.

4. A process for producing a hydrocarbon conversion catalyst which comprises reacting a salt of a metal selected from the group consisting of aluminum, magnesium and zirconium with a polymeric di-alkyl siloxane to form a complex, treating said complex with water and a volatile base to form a precipitate, washing said precipitate with water, and drying the washed material.

5. A process for producing a hydrocarbon conversion catalyst which comprises reacting a polymeric di-alkyl siloxane, an aqueous solution of an aluminum salt, and a volatile base to form a precipitate, washing said precipitate and drying the washed material.

6. A process for producing a hydrocarbon conversion catalyst which comprises reacting anhydrous aluminum chloride with an organic silicon compound, a polymer di-alkyl siloxane to form a complex, treating said complex with water and a volatile base to form a precipitate, washing said precipitate and drying the washed material.

7. A process for producing a hydrocarbon conversion catalyst which comprises reacting a polymeric dimethyl siloxane, a water-soluble salt of a metal selected from the group consisting of aluminum, magnesium and zirconium, water and a volatile base to form a precipitate, washing said precipitate and drying the washed material.

8. A process for producing a hydrocarbon conversion catalyst which comprises reacting a polymeric dialkyl siloxane, anhydrous aluminum chloride, water and a volatile base to form a precipitate, washing said precipitate and drying the washed material.

9. A process for producing a hydrocarbon conversion catalyst which comprises reacting a polymeric dimethyl siloxane, anhydrous aluminum chloride, water and a volatile base to form a precipitate, washing said precipitate and drying the washed material.

10. The process defined in claim 6 further characterized in that said volatile base comprises ammonium hydroxide.

11. The process defined in claim 2 further characterized in that said volatile base comprises ammonium hydroxide.

12. A process for producing a hydrocarbon conversion catalyst which comprises reacting a polymeric di-alkyl siloxane, aluminum chloride, water and ammonia to form a precipitate, washing said precipitate and drying the washed material.

13. A hydrocarbon conversion catalyst formed by reacting a polymeric di-alkyl siloxane, a salt of a metal selected from the group consisting of aluminum, magnesium and zirconium, and an aqueous solution of a base to form a precipitate, and drying said precipitate.

CHARLES L. THOMAS.
CURTIS F. GERALD.

REFERENCES CITED

The following references are of record in the file of this patent:

UNITED STATES PATENTS

| Number | Name | Date |
| --- | --- | --- |
| 1,814,493 | Pfannenstiel et al. | July 14, 1931 |
| 2,306,222 | Patnode | Dec. 22, 1942 |
| 2,342,249 | Burk | Feb. 22, 1944 |
| 2,373,295 | Cramer | Apr. 10, 1945 |
| 2,405,408 | Connolly | Aug. 6, 1946 |

OTHER REFERENCES

Journal Chem. Society (London), vol. 134, pages 2774–8, 1931.

Journal American Chem. Soc., Feb. 2, 1946, vol. 68, page 344.

Chem. & Eng. News, vol. 24, No. 9, May 10, 1946, pages 1233–34.